United States Patent [19]

Peaslee et al.

[11] Patent Number: 5,265,203
[45] Date of Patent: Nov. 23, 1993

[54] HARDWARE MULTIPROCESS SCHEDULER IN A GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 582,695

[22] Filed: Sep. 14, 1990

[51] Int. Cl.$^5$ .............................. G06F 15/20
[52] U.S. Cl. ...................... 395/162; 395/163; 395/164; 395/375; 395/575; 395/650
[58] Field of Search .................... 395/162-163, 395/164, 166, 130, 134, 500, 575, 650, 325, 375; 364/200 MS File, 900 MS File

[56] References Cited

U.S. PATENT DOCUMENTS

| | | | |
|---|---|---|---|
| 3,530,438 | 9/1970 | Mellen et al. | 395/650 |
| 4,811,205 | 3/1989 | Normington et al. | 395/163 |
| 4,916,301 | 4/1990 | Mansfield et al. | 395/162 |
| 5,003,496 | 3/1991 | Hunt, Jr. et al. | 395/134 |
| 5,046,023 | 9/1991 | Katsura et al. | 395/162 |

Primary Examiner—Robert L. Richardson
Assistant Examiner—Kee M. Tung
Attorney, Agent, or Firm—Wanda K. Denson-Low

[57] ABSTRACT

An integrated hardware multiprocess scheduler for controlling a plurality of concurrently operating graphics generating subsystems required for the generation of display signals for a graphics rendering processor. In so doing, the hardware scheduler controls the operations of these subsystems in parallel, while incorporating in hardware, certain aspects of a software operating system. This feature promotes functional independence between the various controlled subsystems and promotes communication between them. Such independence is accomplished by the structure of the scheduler which is set up so that each of the controlled subsystems is connected to a common status/enable bus in parallel with the other controlled subsystems and each of them is operationally independent of the others. Depending on the instructions received, the scheduler enables and disables one or more of these subsystems at essentially the same time. This architecture supports zero overhead scheduling and effective teaming together of these independent systems.

18 Claims, 4 Drawing Sheets

HARDWARE MULTIPROCESS SCHEDULER IN A GRAPHICS RENDERING PROCESSOR

CROSS REFERENCE TO RELATED APPLICATIONS

The present application is related to contemporaneously filed patent applications: Ser. No. 07/582,696, filed on Sep. 14, 1990, entitled, "Dual Programmable Block Texturing and Complex Clipping and Graphics Rendering Processor," Ser. No. 07/582,709, filed on Sep. 14, 1990, entitled "Dual Hardware Channels and Hardware Context Switching in a Graphics Rendering Processor," Ser. No. 07/582,710, filed on Sep. 14, 1990, entitled "Concurrent General Purpose and DMA Processing in a Graphics Rendering Processor," Ser. No. 07/582,728, filed on Sep. 14, 1990, entitled "Integrated Hardware Generator for Area Fill, Conics and Vectors in a Graphics Processor", Ser. No. 07/582,694, filed on Sep. 14, 1990, now U.S. Pat. No. 5,213,674, entitled "Hardware Bit Block Transfer Operator in a Graphics Rendering Processor," Ser. No. 07/582,693, filed on Sep. 14, 1990, entitled "Hardware Symbology and Text Generator in a Graphics Processor," and Ser. No. 07/582,697, filed on Sep. 14, 1990, entitled "Multifunction High Performance Graphics Rendering Processor," all by John M. Peaslee and Jeffrey C. Malacarne, whose teachings are incorporated herein by reference.

BACKGROUND

The present invention relates generally to digital graphic display processors, and more particularly, to a programmable integrated hardware multiprocess scheduler that forms a working part of a graphics rendering processor.

Real time digital electronic displays are used in many applications such as military command and control workstations and air-traffic control systems. In these displays, the displayed information typically comprises real-time processed data generated by a host processor adapted to receive the basic real-time information from one or more radars, communications systems and/or other data processors. These data are combined with one or more graphic primitives, such as a circle, ellipse or polygon, along with generated alphanumerics, mask areas and texture patterns to provide a relatively easily understood comprehensive graphic display on an output device such as cathoderay tube. In contemporary systems, the various components of the graphics display such as the graphic primitives, mask windows, fill texturing and the like are provided either by a general purpose computer based graphics generator or by a hardware specific graphics generator. Of these, general purpose graphics generators offer system versatility but usually must sacrifice some degree of system performance for ease of programming. On the other hand, hardware specific graphics generators, called cogenerators, provide good system performance.

Increasing demands on military command and control systems, military and civil air-traffic control systems and the like have created a need for high performance graphics cogenerators which, in addition, provide a versatile and easily implemented programming capability. One feature in such a cogenerator is the ability to process a multiplicity of graphics generating needs for symbols, data and graphics figures quickly and easily. In many contemporary graphics cogenerators, such generation is accomplished with a set of software controlled subsystems, each of which must be individually preprogrammed to provide the necessary output information. In such a case the programmer is required to create a routine which initializes and controls the hardware throughout the operation, often interacting on a word by word basis. Furthermore, many single chip processors of the prior art utilize microcoded architectures that, while facilitating testing, are much more sequentially oriented.

There has heretofore been a need for an integrated hardward scheduler that efficiently and effective controls the operation of independently operating subsystems in parallel, with such operations requiring minimum input from the system operator.

SUMMARY OF THE INVENTION

In its broadest aspects, the present invention comprises an integrated hardware multiprocess scheduler that control of a plurality of concurrently operating graphics subsfunctions required for the generation of display signals for a graphics rendering processor. In so doing, the hardware scheduler controls the operations of these subsystems in parallel, while incorporating certain aspects of a software operating system in hardware. This feature promotes the functional independence of the various controlled subsystems and also promotes communication between them.

Such independence is accomplished by the structure of the scheduler, which comprises an instruction decoder to receive and then transmit operating instructions into a common status/enable bus, where they are combined with status data from each of the independently controlled subsystems. Each of the controlled subsystems is connected to the bus in parallel with the other controlled subsystems, and each of them is operationally independent of the others. Depending on the instructions received, the scheduler enables and disables one or more of these subsystems at essentially the same time. This architecture supports zero overhead scheduling and effective teaming of these independent subsystems.

In the embodiment illustrated herein, six operating functions are concurrently controlled. These include image bus command generation, conic fill/vector generation, symbol generation, bit block transfer, dual block texturing, and complex clipping functions. A state register is included to keep track of macrosequences which require multiple micro-operations for the subsystem under control.

BRIEF DESCRIPTION OF THE DRAWINGS

The various features and advantages of the present invention may be more readily understood with reference to the following detailed description taken in conjunction with the accompanying drawings, wherein like reference designate like structural elements and in which.

DETAILED DESCRIPTION

Figure 1:
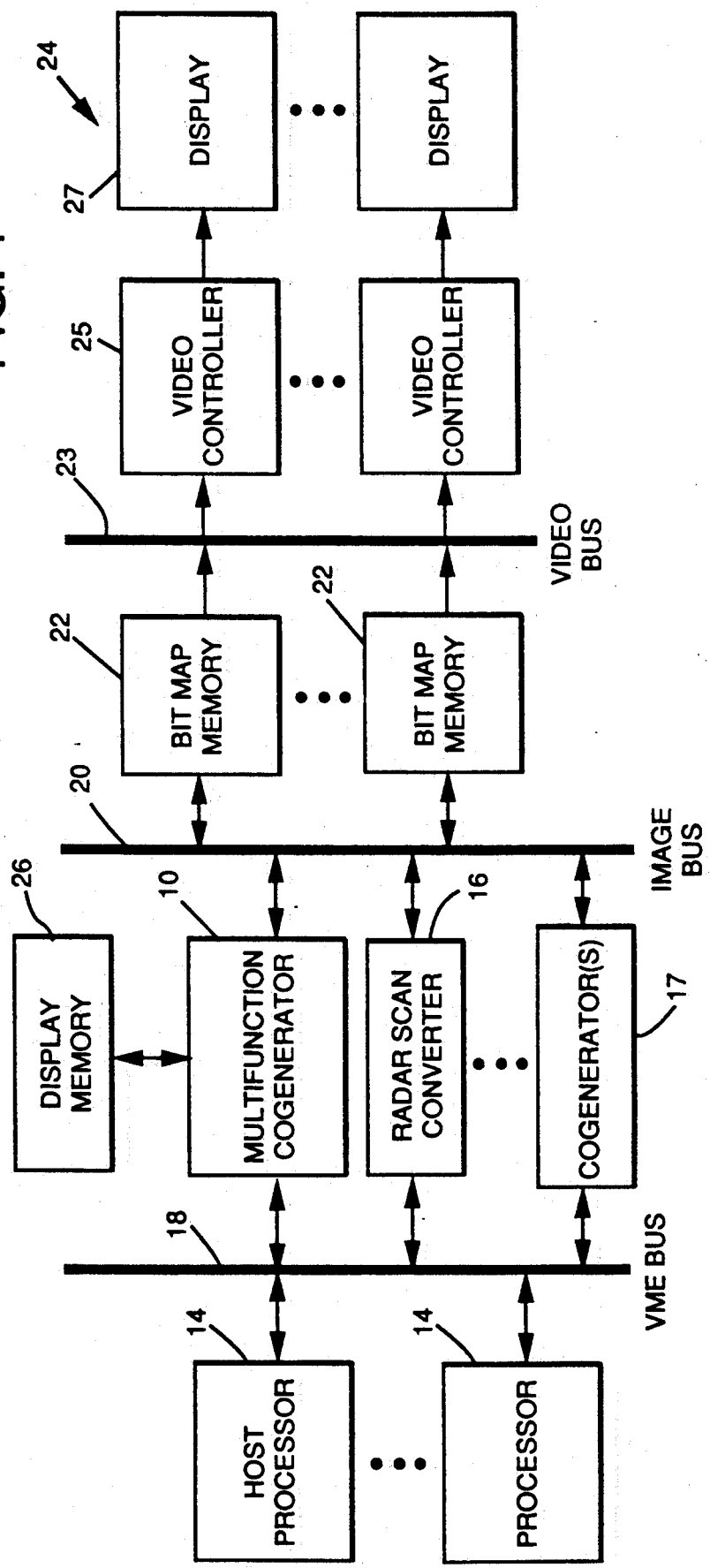
FIG. 1 is a basic block diagram of a dual channel multifunction cogenerator of which the present invention forms a part.

Referring now to FIG. 1, there is shown a basic block diagram of a multifunction cogenerator (MCG) 10 of which the multiprocess scheduler of the present invention forms a functionally distinct part. The cogenerator 10 shown is a dual channel, high performance graphics rendering processor which provides unique solutions for a wide variety of graphics system applications. It is a hardware based device which operates in conjunction with one or more general purpose data processing systems such as a military command and control system, said system further comprising one or more real time-host processors 14 and other real time data generating devices, such as a radar scan converter 16 or additional cogenerators 17. The host processor(s) 14, radar scan converter 16 and other cogenerators 17 feed data into the cogenerator 10 by way of a multifunction bus 18, and the data is combined with graphics data generated within the cogenerator 10. The combined data are then output as a set of signals for the generation of a graphics display by way of a 64-bit bidirectional, multiuser, interconnect image bus 20 to a bit mapped memory 22 by way of a video bus 23 to a display system 24 comprising a video controller 25 and a display 27.

In overview, cogenerator 10 is a high performance single chip graphics rendering processor. As shown in the embodiment illustrated in FIG. 2, the cogenerator 10 includes a tri-ported display memory 26. This has a memory address space, in a working embodiment, of 4 megabytes by 32 bits and is used to store all commands and parameters required for cogenerator 10 to function properly, with appropriate buffer logic. The display memory is accessible by a display list processor 32, an internal graphics generator 34 and the host processor 14. The host processor 14 reads and writes to the cogenerator 10 and to perform random reads and writes at any address within the display memory 26 address space. The cogenerator 10 monitors the input of data from the host processor 14 to the display memory 26 to synchronize updating of data from the host processor 14 with the output of graphics signals from the cogenerator 10. A display memory interface unit 36 performs the actual memory cycles within display memory 26. It is essentially a tri-port memory controller.

In operation, the cogenerator 10, under the command of the host processor 14, fetches instructions from the display memory 26 and processes these instructions to first calculate and then "draw" processed signals representing the calculated figure into the bit mapped memory 22 by way of the image bus 20. Drawing is performed by entering a set of binary 1 and 0 signals into individual selected memory locations of the bit mapped memory 22. As a functionally distinct part of the cogenerator 10, an area fill generator 43 creates signals representing graphic primitives such as polylines, rectangles, circles, ellipses and polygons and area fills therefor. These primitives signals are combined with other signals representing alphanumeric and other symbols, which are generated in a symbol generator 45, and with yet a third set of signals generated by a block texturing clipper 30 to produce the final graphics signal which is then read into a pixel address in the bit mapped memory 22. Typically, the bit map memory 22 has multiple memory layers which set the color and intensity for the graphics display pixels defined at each memory location.

Stored in the display memory 26 are two first in, first out (FIFO) memory buffers, one for each of two drawing channels, under control of two FIFO buffer controllers 38, 40, one of which has a higher priority assigned to it than the other. An address stack is internally provided in each FIFO buffer to store subroutines calls. There is also an attribute stack to store all internal cogenerator attributes for hardware context switching, a sin/cosine table for drawing graphics, up to 128 font tables to draw stroked and/or dot matrix symbols and characters and finally a large display list region. A more detailed description of the cogenerator 10 is given in pending, commonly assigned U.S. patent application Ser. No. 07/582,697, filed on Sep. 14, 1990 entitled, Multifunction High Performance Graphics Rendering Processor," the teachings of which are incorporated herein by reference.

The dual channel FIFO buffer controllers 38, 40 interface the cogenerator 10 to the host processor 14. The FIFO buffer controllers 38, 40 are responsible for performing all interfacing duties such as proper "handshaking" when the bus 18 is performing data transfers, when the host processor 14 reads or writes to the data memory 26. The FIFO buffer controllers 38, 40 perform read or write operations to the display memory 26 for the host processor 14. The FIFO buffer controllers 38, 40 are also responsible for arbitrating high and low priority channels to the multifunction cogenerator 10. A more detailed description of these functions is given in copending commonly assigned U.S. patent application Ser. No. 07/582,709, filed on Sep. 14, 1990 entitled "Dual Hardware Channels and Context Switching in a Graphic Processor," the teachings of which are incorporated herein by reference.

The display list processor 32 performs command and display list processing for the cogenerator 10. Typically, commands are sent to the cogenerator 10 from the host processor 14. The display list processor 32 handles the various ways that commands can be sent to the cogenerator 10. The display list processor 32 interfaces to the display memory 26 using the display memory interface unit 36, reads commands from the FIFO buffers as well as performing other functions. When a command is given to the display list processor 32, it processes the command and determines what action to take.

Context registers 42 store the cogenerator attributes which define the current state of the cogenerator 10. These include parameters such as the cogenerator operational mode; draw pointer position; foreground color; background color; clipping window dimensions; etc. These attributes are important as they define the "personality" of the cogenerator 10 at any given time, and all of them are user programmable. This gives a user a considerable degree of flexibility in operating the display system.

A large readback data multiplexer 44 is used to multiplex data to the display memory interface unit 36 from which they will then be directed to the display memory 26 or back to the host processor 14 by way of the bus 18. Multiple sources of read-back data include the context registers 42, the graphics generator 34 and the block texturing and complex clipper processor 30. If the data are intended for the host processor 14, it will be sent through the FIFO buffer controllers 38, 40 by the display memory interface unit 36. The graphics generator 34 is connected to the readback multiplexer 44 for various cogenerator drawing operations. The block texturing and complex clipper processor 30 also sends data to the readback multiplexer 44.

Figure 2:
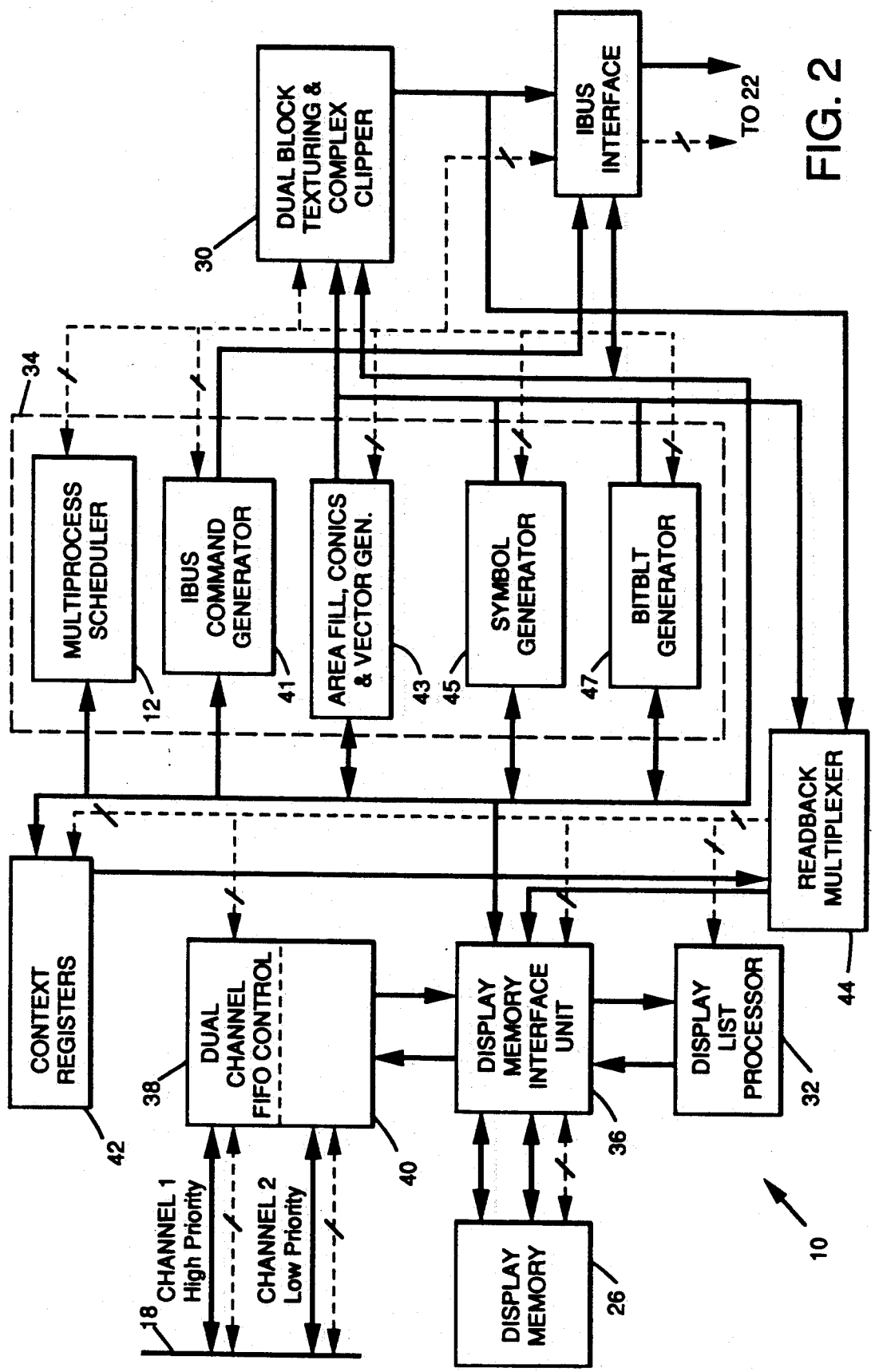
FIG. 2 is a detailed block diagram of a multifunction cogenerator of which the present invention forms a part.

That part of the cogenerator 10 wherein the generation of the primitives and symbols occurs is contained within the dotted block of FIG. 2, identified as graphics generator 34. The graphics generator 34, includes the area fill generator 43, a multiprocess scheduler 12 in accordance with the present invention, a command generator 41, the symbol generator 45 and a bit block transfer (BITBLT) generator 47.

The multiprocess scheduler 12 controls all data transfers between the elements within the graphics generator 34, the command generator 41 enables the image bus 20 to receive output data and transport it to the bit map memory 22, the symbol generator 45 generates alphanumeric signals and the BITBLT generator 47 provides a general purpose means for moving rectangular blocks of image data both within the bit mapped memory 22 and the display memory 26 and between them. The block texturing and complex clipper 30 receives the digital output signals from the area fill and symbol generators 43, 45, combines them and then further processes the combined signal into the final output display which is then read into the bit mapped memory 22 for use with the video display system 24. Details as to how this is done are contained in copending commonly owned U.S. patent application Ser. No. 07/582,696, filed on Sep. 14, 1990, entitled "Dual Programmable Block Texturing and Complex Clipping in a Graphics Rendering Processor." Most of the components shown within the boundaries of block 34 are themselves the subject of one or more copending, commonly owned U.S. Patent Applications. Among these are Ser. No. 07/582,694, filed on Sep. 14, 1990, now U.S. Pat. No. 5,218,674, entitled "Hardware Bit Block Transfer Processor," Ser. No. 07/582,693, filed on Sep. 14, 1990, entitled "Hardware Symbology and Text Generator in a Graphics Generator" Ser. No. 07/582,710, filed on Sep. 14, 1990 entitled "Concurrent General Purpose and DMA Processing in a Graphics Rendering Processor", and Ser. No. 07/582,728, filed on Sep. 14, 1990 entitled "Integrated Hardware Generator for Area Fill, Conics and Vectors in a Graphics Processor". The teachings of all of the above listed patent applications are incorporated herein by reference.

Figure 3:
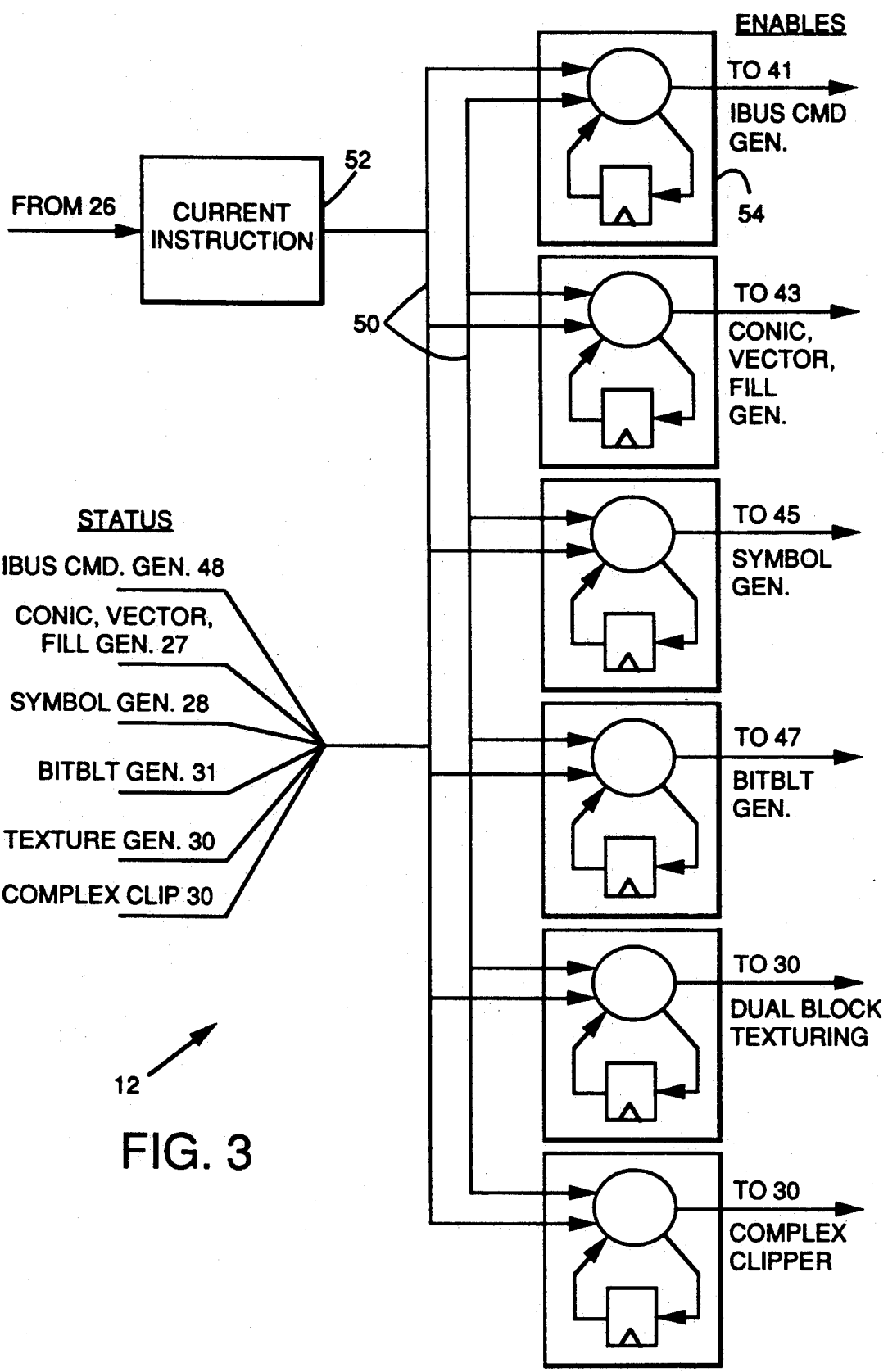
FIG. 3 is a diagram illustrating how the multiprocess scheduler of the present invention operates to control display generation.

The functional characteristics of the hardware multiprocess scheduler 12 of the present invention are shown generally in FIG. 3. As shown therein, the scheduler 12 controls the flow of data to and throughout the several data generating/processing and control subsystems comprising graphics generator 34 and the block texturing and clip mask generator 30. This involves scheduling (enabling) one or more of the six controlled subsystems, when all required inputs are available for current operation, and blocking (disabling) the controlled subsystem(s) when some other subsystem is utilizing its (their) current output.

In operation, instructions received from the cogenerator 10 keep the hardware scheduler 12 cognizant as to what operation is required by each of the controlled subsystems and when. Each of these subsystems is allowed to begin operation as soon as its local input requirements are met and its current output is no longer needed. This serves to decouple each of the individual controlled units from the overall task, thus allowing the operation of each of the six parallel controlled subsystems to proceed as soon as it is able. This approach removes the need for synchronous request/acknowledge "handshaking" and its associated overhead during data transfer between operations. Instead, the hardware multiprocess scheduler 12 of the present invention forms a combinational logic function that responds immediately with enable and load strobes whenever new input data are needed by one of the controlled subsystems.

To facilitate command and control in the embodiment illustrated, the hardware scheduler 12 comprises a control interface bus 50 which carries command and control signals from an instruction decoder 52 and status information transmitted from an image bus command generator 41, the conics/vector/fill generator 43, the symbol generator 45, the BITBLT generator 47, the dual block texturing and clipping functions of texturing clipper 30, and six task control units 54. Command and control is applied by means of each of the task control functions utilizing similar status words for each of the functions controlled, with flags indicating either each function's readiness to accept new input, or the availability of new output therefrom. Complex parallelism is accomplished by creating an environment in which the sequenced functions are free to perform their local processing until a transfer operation to or from another cogenerator function is required. In the present invention it is not necessary to account for every possible combination of the states of every sequenced function to ensure that all of the controlled functions work together.

Figure 4:
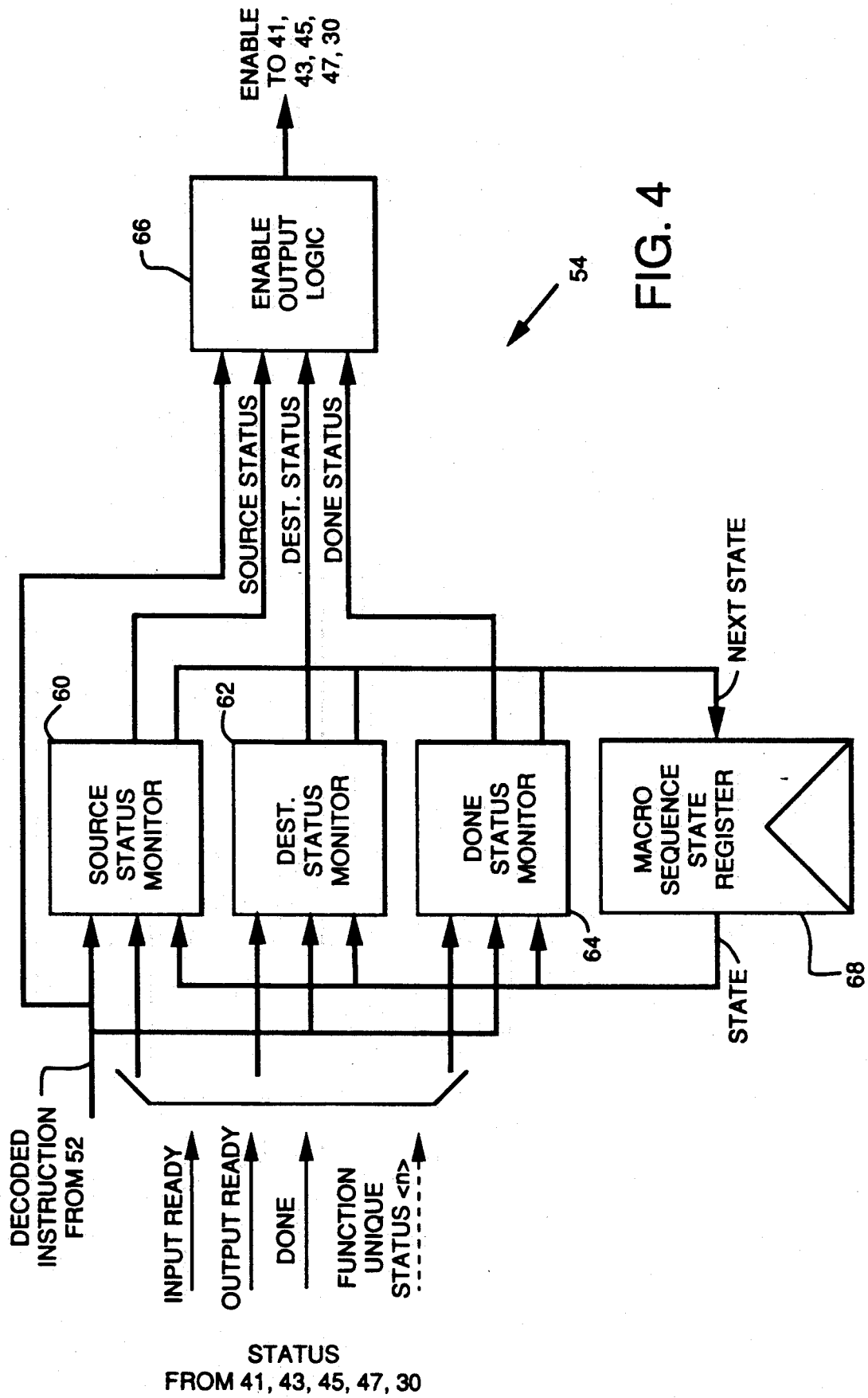
FIG. 4 is an illustration showing in more detail the task control functions of the scheduler of the present invention.

As functionally illustrated in FIG. 4, each of the six task control units 54 comprises four separate subfunctions which, when taken as a whole constitute the control means implemented thereby. These subfunctions comprise source status, destination status, done status and macrosequence status. A source status monitor 60 indicates the availability of valid inputs to the controlled subsystem for further processing, a destination status monitor 62 indicates whether or not the destination is ready to receive the processed data, and a done status monitor 64 indicates whether or not the current processing operation in the controlled subsystem has been completed. These three status conditions are combined in an output logic unit 66 to enable the particular graphics subsystem under control. When multiple input or output operations are required, a macrosequence state register 68 keeps track of these operations to prevent under or over processing of the data.

In practice, whenever a controlled task function is to receive new data, the scheduler 12 determines if a valid input ready signal has been received from the affected cogenerator subsystem If this is the case, the unit is enabled and the data are input from the bus 18, or from other data interfaces between subsystems. At the conclusion of the data input cycle, the controlled subsystem starts processing the data received, in accordance with the particular instructions received by way of the data bus 50 and the instruction decoder 52. When outputs that result from processed input data are ready to be passed to another subsystem, the processing unit transmits an "output ready" flag. Several inputs, whether received concurrently or in sequence, may be required to create a single output. When all required outputs for a given subsystem microsequence operation are completed, the processing unit transmits a "done" flag. Multiple subsystem microsequences may be required to complete the macrosequence for the current cogenerator instruction.

When the unit to which the data are directed has emitted a valid input ready status, the recipient subsystem is asynchronously enabled by the the appropriate task control unit 54 with zero clock delay to receive them and, if necessary, process it. If the recipient unit does not show a valid input ready status, then the corresponding task control function captures the output ready function pulse in a macrostate register 68 to indicate that a data transfer is pending. In either case, whenever the receiving unit sends a valid input ready status, it is asynchronously enabled and the waiting data are then transferred thereto. The input ready signal acts as a flag to indicate the current readiness status of the controlled unit.

For the complex drawing operations performed by the cogenerator 10, typical data transfers between the controlled subsystems often require that multiple outputs become available from several of the controlled units before multiple receiving subsystems can accept the data. The parallel independent architecture of the present invention facilitates such transfers by applying the principles detailed above. For example, while one or more of the controlled subsystems may be occupied in such an operation, the remaining non-affected subsystems are free to operate whenever it is required that they do so. Thus, the image bus command generator 41 and the image bus 20, which are controlled as a totally independent pipeline stage so that while memory cycles are performed in the bit mapped memory 22, and/or while the cogenerator 10 is waiting to be granted access to the image bus 20, the remainder of the system is free to generate the next image bus output.

Further, when graphics primitives from the conics generator 43 are involved, the scheduler 12 can, at any instance, concurrently perform the following tasks: (1) cause a previously rendered vector data image word either to be written into the bit mapped memory 22 or sent to texturing clipper and mask generator 30 for further processing; (2) delay the next image word and/or memory cycle until the controlled subsystem is ready to receive it; (3) enable fetching texture/clip mask data for the current rendering address; (4) enable fetching a future input vector to render; (5) enable writing area fill vectors to display memory 26; (6) enable processing non-graphics display list instructions; (7) enable the rendering of the next image data output to be written into the bit mapped memory 22 or to be sent to texturing clipper and mask generator 30; (8) enable precalculating the constants for the next vector rendering; or (9) hold yet a third vector for processing.

In conjunction with the symbol generator 45, the scheduler 12 can, at any instance, perform the following concurrent tasks: (1) cause a previously rendered vector data word to be written into the bit mapped memory 22 or to be sent to texturing clipper and mask generator 30; (2) delay the next image word and/or memory cycle until the unit is ready to receive it as input; (3) enable either the fetching of two symbol words from the display memory 26; (4) enable processing non-graphics display list instructions; or (5) enable fetching the next graphics generation instruction.

In conjunction with the BITBLT generator 47, the scheduler 12 can, at any instant, perform the following concurrent tasks: (1) cause the second of two source data words to be written into the bit mapped memory 22; (2) enable the loading/shifting the first of the two source words; (3) enable the fetching of texturing/clip mask data from the texturing clipper and mask generator 30 for the next destination write; (4) enable processing non-graphics display list instructions; (5) enable fetching the next graphics instruction; or (6) generate the next source read or write address.

In the present invention, all of this interdependant handshaking occurs without the necessity of providing what might amount to literally hundreds of individual control lines as would be required if all of the controlled subsystems were to be connected directly to all of the other controlled subsystems for every transfer operation which could possibly occur. While the number of lines can be reduced in systems where high speed data processing is not a major requirement such a simplification would result in an operating system in which at least some of the sequenced operations would have to be unnecessarily disabled while certain other of its operations were in progress. Microprogramming all of the required controls into a memory to overcome this particular problem would necessitate using a memory array which would have to be equal to about two times the number of required control lines, which is not practically realizable.

Thus there has been described a new an improved multiprocess scheduler for use in a graphics rendering processor. It is to be understood that the above-described embodiment is merely illustrative of some of the many specific embodiments which represent applications of the principles of the present invention. Clearly, numerous and other arrangements can be readily devised by those skilled in the art without departing from the spirit and scope of the present invention.

What is claimed is:

1. An integrated hardware multiprocess graphics scheduler for controlling a plurality of graphics generating subsystems which are used in a graphics rendering processor, said graphics rendering processor interfacing to a host processor that generates command and control signals for said graphics rendering processor, said graphics processor comprising a display memory for storing data and instructions for said plurality of graphics generating subsystems and a bit mapped memory for storing the signals representing said generated graphics for ultimate display on a display system, wherein said graphics scheduler is characterized by:

instruction decoding means for receiving and decoding instructions transferred to said scheduler from said display memory by said graphics rendering processor and said host processor;

bus means coupled to the instruction decoding means for transferring said decoded instructions to one or more of the controlled plurality of graphics generating subsystems; and task control means coupled to the bus means and each of the controlled plurality of graphics generating subsystems for monitoring an operative status of each of the controlled plurality of graphics generating subsystems and enabling respective ones thereof to perform their particular tasks;

said task control means including status monitoring means for monitoring the operative status of each of the controlled plurality of graphics generating subsystems so that a controlled subsystem is enabled to receive and process data and instructions only when it is ready to receive and process them, and the controlled subsystem is enabled to output the processed data only when an element selected to receive the processed data has generated a status signal indicating that it is ready to receive the output data, and enabling means for individually enabling each of the controlled subsystems to accept and process the instructions and data sent thereto and for selectively transmitting the processed data to a second controlled subsystem for further processing or to the display memory for storage or display.

2. The scheduler of claim 1 wherein the task control means is characterized by:

means for controlling multiple interdependent ones of the plurality of graphics generating subsystems in response to data flow between the subsystems.

3. The scheduler of claim 1 wherein said status monitoring means is characterized by:

source status monitoring means;
destination status monitoring means;
operation complete status monitoring means;
a state register; and
a status/enable bus coupled between each of the status monitoring means and the state register.

4. The scheduler of claim 1 wherein the enabling means is characterized by:

enabling logic coupled to each of the status monitoring means for enabling respective ones of the controlled subsystems to process data and instructions sent thereto.

5. The scheduler of claim 1 wherein the subsystems are characterized by:

graphics generators for generating graphics primitives and alphanumeric and symbolic characters.

6. The scheduler of claim 5 wherein the graphics processor is further characterized by:

a block texturing and clip mask generator for combining the signals from said primitive and character generators and to produce a final graphics display signal.

7. An integrated hardware multiprocess graphics scheduler for controlling a plurality of graphics generating subsystems which are used in a graphics rendering processor, said graphics rendering processor interfacing to a host processor that generates command and control signals for said graphics rendering processor, said graphics processor comprising a display memory for storing data and instructions for said plurality of graphics generating subsystems and a bit mapped memory for storing the signals representing said generated graphics for ultimate display on a display system, and wherein said plurality of graphics generating subsystems comprise graphics generators for generating graphics primitives and alphanumeric and symbolic characters, said graphics rendering processor comprising a block texturing and clip mask generator adapted to combine the signals from said primitive and character generators and to produce a final graphics display signal, said graphics rendering processor comprising means for transferring blocks of data from said plurality of graphics generating subsystems to said display memory at a predetermined address therein and for writing said combined signals into the bit mapped memory of the graphic display system, said graphics scheduler comprising:

instruction decoding measn for receiving and decoding instructions transferred to said scheduler from said display memory by said graphics rendering processor and said host processor;

bus means coupled to the instruction decoding means for transferring said decoded instructions to one or more of the controlled plurality of graphics generating subsystems; and task control means coupled to the bus means and each of the controlled plurality of graphics generating subsystems for monitoring an operative status of each of the controlled plurality of graphics generating subsystems and enabling respective ones thereof to perform their particular tasks;

said task control means including status monitoring means for monitoring the operative status of each of the controlled plurality of graphics generating subsystems so that a controlled subsystem is enabled to receive and process data and instructions only when it is ready to receive and process them, and the controlled subsystem is enabled to output the processed data only when an element selected to receive the processed data has generated a status signal indicating that it is ready to receive the output data, and enabling means for individually enabling each of the controlled plurality of graphics generating subsystems to accept and process data to a second controlled subsystem for further processing or to the display memory for storage or display.

8. The scheduler of claim 7 wherein the task control means comprises:

means for controlling multiple interdependent ones of the plurality of graphics generating subsystems in response to data flow between the subsystems.

9. The scheduler of claim 7 wherein said status monitoring means is characterized by:

source status monitoring means;
destination status monitoring means;
operation complete status monitoring means;
a state register; and
a status/enable bus coupled between each of the status monitoring means and the state register.

10. The scheduler of claim 7 wherein the enabling means comprises:

enabling logic coupled to each of the status monitoring means for enabling respective ones of the controlled subsystems to process data and instructions sent thereto.

11. The scheduler of claim 7 wherein said task control means comprises means for generating a signal indicating that a controlled subsystem has finished its current processing operation and is ready to perform a further operation.

12. The scheduler of claim 7 wherein said task control means comprises means for generating a signal indicating that a controlled subsystem has finished its current processing operation and is ready to perform a further operation.

13. An integrated hardware multiprocess graphics scheduler for controlling a plurality of graphics generating subsystems which are used in a graphics rendering processor, said graphics rendering processor interfacing to a host processor that generates command and control signals for said graphics rendering processor, said graphics rendering processor comprising a display memory for storing data and instructions for said subsystems and a bit mapped memory for storing the signals representing said generated graphics for ultimate display on a display system, wherein said graphics scheduler characterized by:

instruction decoding means for receiving and decoding instructions transferred to said scheduler from said display memory by said graphics rendering processor and said host processor;

bus means coupled to the instruction decoding means for transferring said decoded instructions to one or more of the controlled subsystems; and task control means coupled to the bus means and each of the controlled subsystems for monitoring an operative status of each of the controlled subsystems and enabling respective ones thereof to perform their particular tasks, and wherein the control means comprises:

status monitoring means for monitoring the operative status of each of the controlled subsystems so that a controlled subsystem is enabled to receive and process data and instructions only when it is ready to receive and process them, and the controlled subsystem is enabled to output the processed data only when an element selected to receive the processed data has generated a status signal indicating that it is ready to receive the output data; and enabling means for individually enabling each of the controlled subsystems to accept and process the instructions and data sent thereto and for transmitting the processed data to a second controlled subsystem as input for further processing or to the display memory for storage or display.

14. The scheduler of claim 13 wherein said status monitoring means is characterized by:
source status monitoring means;
destination status monitoring means;
operation complete status monitoring means;
a state register; and
a status/enable bus coupled between each of the status monitoring means and the state register.

15. The scheduler of claim 13 wherein the enabling means is characterized by:
enabling logic coupled to each of the status monitoring means for enabling respective ones of the controlled subsystems to process data and instructions sent thereto.

16. An integrated hardware multiprocess graphics scheduler for controlling a plurality of graphics generating subsystems which are used in a graphics rendering processor, said graphics rendering processor interfacing to a host processor that generates command and control signals for said graphics rendering processor, said graphics rendering processor comprising a display memory for storing data and instructions for said subsystems and a bit mapped memory for storing the signals representing said generated graphics for ultimate display on a display system, and wherein said subsystems comprise graphics generators for generating graphics primitives and alphanumeric and symbolic characters, said graphics rendering processor comprising a block texturing and clip mask generator adapted to combine the signals from said primitive and character generators and to produce a final graphics display signal, said graphics processor comprising means for transferring blocks of data from said subsystems to said display memory at a predetermined address therein and for writing said combined signals into the bit mapped memory of the graphic display system, said graphics scheduler comprising:

instruction decoding means for receiving and decoding instructions transferred to said scheduler from said display memory by said graphics rendering processor and said host processor;

bus means coupled to the instruction decoding means for transferring said decoded instructions a selected number of the controlled plurality of graphics generating subsystems; and task control means coupled to the bus means and each of the controlled plurality of graphics generating subsystems for monitoring an operative status of each of the controlled subsystems and enabling respective ones thereof to perform their particular tasks, and wherein the control means comprises:

status monitoring means for monitoring the operative status of each of the controlled plurality of graphics generating subsystems so that a controlled subsystem is enabled to receive and process data and instructions only when it is ready to receive and process them, and the controlled subsystem is enabled to output the processed data only when an element selected to receive the processed data has generated a status signal indicating that it is ready to receive the output data; and enabling means for individually enabling each of the controlled plurality of graphics generating subsystems to accept and process the instructions and data sent thereto and for transmitting the processed data to a second controlled subsystem for further processing or to the display memory for storage or display.

17. The scheduler of claim 16 wherein said status monitoring means is characterized by:
source status monitoring means;
destination status monitoring means;
operation complete status monitoring means;
a state register; and
a status/enable bus coupled between each of the status monitoring means and the state register.

18. The scheduler of claim 16 wherein the enabling means comprises:
enabling logic coupled to each of the status monitoring means for enabling respective ones of the controlled subsystems to process data and instructions sent thereto.

* * * * *